3,094,537
RESOLUTION OF ACETYL-DL-TRYPTOPHAN
Halbert C. White, Midland, Mich., assignor to The Dow Chemical Company, Midland, Mich., a corporation of Delaware
No Drawing. Filed May 1, 1961, Ser. No. 106,474
4 Claims. (Cl. 260—319)

This invention relates to a new method for resolving acetyl-DL-tryptophan whereby good recoveries of both optical isomers are obtained.

Acetyl-DL-tryptophan is the acetyl derivative of the racemic DL-tryptophan obtained by chemical synthesis. For nutritional studies and for supplementation of animal or human diets, it is desirable to have available the naturally occurring isomer, L-tryptophan or the nutritionally equivalent acetyl-L-tryptophan.

Acetyl-DL-tryptophan has been resolved in the past by enzymatic methods wherein an enzyme acts preferentially on one isomer, thereby making possible a separation, and by chemical methods wherein salts are formed with bases such as quinine or phenethylamine and these salts are separable by crystallization techniques into the individual optical isomers. These known methods employ expensive or scarce reagents and involve procedures which are often time consuming or wasteful of the relatively costly starting amino acid.

It has now been found that by reacting L-lysine, a relatively cheap and abundantly available amino acid, with acetyl-DL-tryptophan, salts of the composition acetyl-L-tryptophan·L-lysine and acetyl-D-tryptophan·L-lysine are formed and it has been found further that these salts have essentially reversed relative solubilities in water and in aqueous methanol. That is, acetyl-D-tryptophan·L-lysine is less soluble in water than is acetyl-L-tryptophan·L-lysine and when an aqueous solution of the two is cooled to cause crystallization, a product rich in acetyl-D-tryptophan·L-lysine crystallizes from the solution. When the filtrate from this mixture is then diluted with methanol, substantially pure acetyl-L-tryptophan·L-lysine is precipitated. This reversal of relative solubilities of the two enantiomorphic salts in going from the one solvent system to the other is surprising and different from the usual behavior of similar salts. The discovery of this unusual behavior makes possible a simplified and efficient separation of the D and the L salts. These L-lysine salts are easily decomposed to the corresponding acetyltryptophan or to tryptophan by treatment with a suitable acid under the appropriate conditions. The acetyl-D-tryptophan may be racemized and recycled to the process.

By use of my new process, the two optical isomers of acetyl-DL-tryptophan may be separated in good yield and obtained as pure materials. The process operates at moderate temperatures and utilizes abundant and easily handled reagents and solvents.

The formation of the L-lysine salts is accomplished by combining essentially equal molar proportions of L-lysine and acetyl-DL-tryptophan dissolved in a mutual solvent. Preferably this is done in aqueous solution, using about 200–600 ml. of water per gram mole of L-lysine at a temperature of about 50–100° C. to maintain a homogeneous solution. The use of equal molar proportions of the reactants is a practical limitation for economic reasons and it also avoids complications in the separation procedure. In this preferred method of preparation, the water may additionally contain up to about 15–20 percent by volume of methanol. A larger amount of methanol causes undesirable precipitation of more of the acetyl-L-tryptophan·L-lysine along with the D-salt.

The preparation may also be carried out in more dilute aqueous solution at a lower temperature and the reaction solution thereafter concentrated for the fractional precipitation step, but the first described procedure is ordinarily preferred.

When the reaction solution has been prepared in the preferred concentration and temperature ranges specified above, it is cooled below 50° C., preferably to about 5–25° C., thereby causing a major proportion of the acetyl-D-tryptophan·L-lysine to crystallize out of solution. Too low a temperature causes formation of fine crystals which are difficult to filter, higher temperatures result in insufficient precipitation of the D-salt. The concentration and temperature are preferably regulated within the ranges shown to cause a maximum precipitation of the D-salt in a filterable form. The resulting filtrate may be used directly as a source of crude acetyl-L-tryptophan or a pure L-salt may be precipitated by dilution with methanol.

The filtrate from the separation of the D-salt together with any washes of that salt is suitably somewhat concentrated. The solution is then diluted with about 600 to 4000 ml. of methanol per gram mole of L-lysine, preferably at about 50° to 70° C., whereupon essentially pure acetyl-L-tryptophan, L-lysine salt is precipitated in crystalline form. To obtain a good yield of easily filterable crystals, the proportion of methanol used is adjusted so that the final solvent composition lies in the approximate range of 50 to 95 percent methanol by volume. Lower temperatures may be used for the precipitation, but finer crystals more difficult to filter are then obtained. Temperatures higher than 70° C., which is the approximate reflux temperature, require the use of pressure equipment and this disadvantage usually outweighs any advantage gained by faster filtering of the crystal slurry thereby produced. The mother liquor from this step of the process may be concentrated to remove solvent and recycled.

As may be seen from the above description of the preferred mode of operation, it is possible to cause the precipitation of the isomeric salts in reverse order. For example, crystallization of the L-lysine salts of acetyl-DL-tryptophan from aqueous methanol containing about 75% by volume of methanol gives as a product acetyl-L-tryptophan. L-lysine of about 70% purity, the remainder being the D-salt. Since the primary object of the process is the recovery of acetyl-L-tryptophan or L-tryptophan itself in good yield and of high purity, such a procedure would not ordinarily be a desirable operation.

Acetyl-L-tryptophan, L-lysine salt may be used for nutritional purposes as such, being a combination of two essential amino acids, or it may be decomposed into acetyl-L-tryptophan and an L-lysine salt by reaction with an acidic substance such as hydrochloric acid or a suitable strongly acidic cation exchange resin. L-tryptophan may be obtained directly by stronger treatment, for example, by boiling acetyl-L-tryptophan, L-lysine salt with 1 N HCl.

The following examples show one mode of operating the process within the preferred ranges of conditions.

*Example 1*

A solution of 73.1 g. (0.5 g. mole) of L-lysine in 179 g. of water was warmed to 90° C. and 123 g. (0.5 g. mole) of acetyl-DL-tryptophan was added with stirring. The resulting solution was cooled to 40° C. and a seed of acetyl-D-tryptophan, L-lysine salt was added. The solution was then cooled to 20° C. with stirring over a one-hour period and held at about 20° C. for an additional hour. The thick slurry which formed was filtered and the white crystalline product was washed first with 50 ml. of 70% aqueous methanol and then with 100 ml. of methanol. The dry product weighed 66 g. (0.168 g. mole) and had a specific rotation $[\alpha]_d^{25}$ (4% in H₂O) −10.3°, corresponding to 91% of the D-isomer. Recrystallization from 1.5 parts of water gave a 77% recovery of acetyl-D-tryptophan, L-lysine salt with $[\alpha]_d^{25}$ (4% in H₂O) −13.2° and melting point 198 to 199° C.

Acetyl-D-tryptophan·L-lysine is useful in nutritional studies and as a source of acetyl-D-tryptophan which may be racemized to acetyl-DL-tryptophan and recycled to the process.

The mother liquor and methanol washes may be used as a source of a crude grade of acetyl-L-tryptophan containing about 25% of the D-isomer. Examples 2 and 3 illustrate the separation of the pure L-isomer.

*Example 2*

The combined mother liquor and methanol washes from Example 1 were concentrated to a weight of 200 g. under reduced pressure, warmed to 65° C., and diluted with 600 ml. of methanol added over a period of 1.5 hours at 65° to 67° C. After an additional hour at about 67° C., the slurry which had formed was filtered without cooling and the fine white powder obtained was washed with 100 ml. of methanol. The dry product amounted to 80.6 g. and had a melting point of 228° to 229° C., $[\alpha]_d^{25}$ (4% in H₂O) +21.0°, corresponding to 97.5% acetyl-L-tryptophan, L-lysine salt by rotation. This represented an 80% recovery of the initial acetyl-L-tryptophan content.

*Example 3*

A quantity of 39.2 g. (0.10 g. mole) of acetyl-L-tryptophan, L-lysine salt from Example 2 was dissolved in 80 ml. of water at 90° C. and 25 ml. of 5 N HCl was added to the solution. The resulting slurry was cooled to 5° C. for one hour, filtered, and the white crystalline product was washed with water and dried to give 23.5 g. of acetyl-L-tryptophan of 97.5% assay by rotation.

By the same procedure, acetyl-D-tryptophan, L-lysine salt is converted in similar yield to acetyl-D-tryptophan. This may be racemized to acetyl-DL-tryptophan by any of several known methods, for example, by treatment of the sodium salt with acetic anhydride at 35° to 40° C. as described by du Vigneaud et al., J. Biol. Chem. 96, 511.

I claim:

1. A process for resolving acetyl-DL-tryptophan which comprises forming an aqueous solution containing one gram mole of acetyl-DL-tryptophan·L-lysine in about 200–600 ml. of water at about 50–100° C., cooling said solution below 50° C., thereby precipitating a major proportion of the acetyl-D-tryptophan·L-lysine, and separating the precipitated salt.

2. A process as described in claim 1 wherein the filtrate from the separation of the precipitated acetyl-D-tryptophan·L-lysine is diluted with from about one to about 19 parts of methanol per part by volume of water, thereby precipitating a major proportion of the acetyl-L-tryptophan·L-lysine, and separating the precipitated salt.

3. A process as described in claim 1 wherein the acetyl-D-tryptophan·L-lysine is decomposed to acetyl-D-tryptophan which in turn is racemized and recycled to the process.

4. A process as described in claim 2 wherein the acetyl-L-tryptophan·L-lysine is converted to L-tryptophan.

References Cited in the file of this patent

UNITED STATES PATENTS 2,865,928  Fields et al. _____ Dec. 23, 1958

OTHER REFERENCES

Du Vigneaud et al.: J. Biol. Chem., volume 96, 511 (1932).

Kolb et al.: J. Biol. Chem., volume 144, page 193 (1942).